United States Patent [19]

Fautier et al.

[11] Patent Number: 5,239,512
[45] Date of Patent: Aug. 24, 1993

[54] METHOD AND APPARATUS FOR BLOCKWISE STORAGE OF PICTURES HAVING VARIABLE ASPECT RATIOS

[75] Inventors: Thierry Fautier, Paris; Jean-Pierre Michel, Yerres, both of France

[73] Assignee: U.S. Philips Corporation, New York, N.Y.

[21] Appl. No.: 649,518

[22] Filed: Jan. 31, 1991

[30] Foreign Application Priority Data

Feb. 2, 1990 [FR] France ............... 90 01241

[51] Int. Cl.⁵ .................................. G11C 13/00
[52] U.S. Cl. .................. 365/230.01; 365/230.02
[58] Field of Search .................. 340/798, 799; 365/230.01, 230.02, 230.08

[56] References Cited

U.S. PATENT DOCUMENTS

4,951,042 8/1990 Belch ........................ 340/799
5,131,080 7/1992 Fredrickson et al. ........ 340/799

Primary Examiner—Terrell W. Fears
Attorney, Agent, or Firm—Michael E. Marion

[57] ABSTRACT

In this method, the pictures are processed in blocks whose dimensions (H,V) expressed in a number of pixels are integral powers of two, and the contents (pixels) of the different blocks are stored in the memories one after the other. The device for calculating the position of a pixel in the memory from the position x, y of the said pixel in the picture is formed by two material operators 11, 12 which extract from x and y, respectively, the most significant bits m and p, m and p being the integers such as $2^m = H$ and $2^p 32 V$, a multiplier 19 multiplying the number of blocks in a picture line NBLOCH by the vertical component ADBLOCV supplied by the operator 12, and an adder 20 which adds together the result supplied by the said multiplier and the coordinate ADBLOCH supplied by the operator 11.

7 Claims, 8 Drawing Sheets

METHOD AND APPARATUS FOR BLOCKWISE STORAGE OF PICTURES HAVING VARIABLE ASPECT RATIOS

BACKGROUND OF THE INVENTION

The present invention relates to a method of managing the storage in a memory of a picture processing system, the said memory of the dynamic type being organised in rows and columns with burst-type access, in which system the pictures are processed blockwise, each block being square or rectangular and comprising a plurality of pixels (H*V) in the horizontal and the vertical direction, and the description of the pixels within a block being effected by considering the pixels one after the other in consecutive parallel lines in the block.

It also relates to an arrangement provided with a memory of the dynamic type, organised in rows and columns with burst-type access, for storing a blockwise processed picture, each one of the said blocks being a square or a rectangle whose horizontal and vertical dimensions, expressed in a number of pixels which are integral powers of two, the description of the pixels contained in a block being effected by considering the pixels in consecutive parallel lines of the block.

For the low-rate information component picture compression algorithms, the temporal processing is of great importance, requiring a considerable storage capacity. Moreover, for this type of algorithm, the number of pixels to be processed per unit of time is fixed, which is done, on the one hand, to prevent degradation of the performances of the algorithms and on the other hand to set a limit to the complexity of the encoding and decoding systems. A direct consequence is that the number of pixels to be encoded in a picture and consequently the number of words necessary for its storage is limited.

In certain picture compression applications in which it is desirable to use a variable picture format (form factor), it is neccessary to find an adequacy between the variable format of the pictures and the fixed dimension of the memory intended to receive the pictures during the decoding procedure. Such a case occurs in a multimedia application such as the Interactive Compact Disk ("CDI"), where the picture format is variable.

One of the critical points in the realization of compressed picture decoders based on blocks is the fact that a large quantity of addresses is necessary to access the memory. The memories usually employed for reasons of cost and integration are dynamic memories which are characterized by an access in two time periods consisting in the supply in a first time period of the "row" address and thereafter, after a delay which depends on the type of memory used, the supply in a second time period of the "column" address, and finally the access to the information after a further delay. The access can be faster when the information components to be read are situated in the same row or in consecutive "column" addresses, by utilizing a mode designated "static column mode" or "page mode". In these two cases, the access to the first information corresponds to the two time periods described in the foregoing, but the access to the subsequent information components only requires the second time period.

A further disadvantage is the poor efficiency in the use of the memory location when the number of pixels per line or the number of lines per picture is not a multiple or a submultiple of the number of colums or number of rows of the memory sections.

The document EP-A-0 085 210 describes the use of a specific addressing mode with address jumps in the memory for consecutive picture lines, with the object of facilitating the search for clusters of particular elements. But said document does not take account of the fact that the picture will be divided into regular blocks forming a kind of checker board pattern.

SUMMARY OF THE INVENTION

The invention is based on the idea that the picture compression algorithms are based on blocks whose horizontal and vertical dimensions are sub-multiples of the dimensions of the picture. Moreover, the present invention also makes advantageous use of the existence of the burst-type access mode in the memories used. Thus, in accordance with the invention, the complete description of each block is placed in the memory in the sequence in which the block is described and the blocks are stored one after the other.

The invention is particularly advantageous when the picture has a variable format. It renders it possible to use only the memory capacity necessary for the storage of a picture, irrespective of its form factor. The invention furthermore renders a faster access to the blocks in the picture possible.

The contents of the different blocks are placed in the memory by incrementing the column address up to its limit value, whereafter this address is adjusted to zero and the row address is incremented, and so forth.

The blocks having horizontal and vertical dimensions expressed in a number of pixels which are integral powers of two, the address memory of the beginning of a block containing a given pixel is calculated from the x, y coordinates of this pixel in the picture, by "integral division" and "modulo" having as the dividend one of the said x or y coordinates and as the divisor the said dimension (H or V), horizontal or vertical, respectively, these operations being effected on these values which are represented by binary words by means of dichotomies which as the result of an integral division furnish the bits whose order is higher than the said power of two (m or p), and as the result of a modulo operation the bits whose order is less than or equal to this same power of two.

An arrangement of the type described in the preamble, for the block-wise processing of a picture, each of these blocks having horizontal H and vertical V dimensions expressed in a number of pixels which are integral powers of two, m and p, respectively, and the description of the pixels contained in a block being effected by considering the pixels in consecutive parallel lines in the block, the complete description of each block being stored in the memory in the order of description of the block and the blocks being placed in the memory one after the other, comprises means for calculating the number of a block in the memory from the x, y coordinates of a pixel of this block, which means are formed by two material operators which from the binary words representing the values of x and y extract the bits having a weight higher than m and p, respectively, a multiplier to which there are applied as multiplicands the number of blocks per picture line and also the binary word formed by the bits which were extracted by one of the said operators in the binary word representing y (which bits represent the vertical coordinate in the picture of the block containing the pixel), and an adder to which there are applied for the purpose of being added together the result furnished by the said multiplier and also the binary word constituted by the bits extracted by the other of said operators from the binary word representing x (which bits represent the horizontal coordinate in the picture of the block containing the pixel.

Moreover, the arrangement advantageously includes means for calculating the address relating to a pixel in a block from its address x, y in the picture, which means are formed by two material operators which from the binary words representing the value of x and y, the m and p bits, respectively, having the least significant weight, the two groups of extracted blocks being applied to a further material operator which shifts to the left the group of bits extracted from y by one of the said two operators, and concatenates it with the group of bits extracted from x by the other of the said two operators.

Advantageously, the arrangement further includes means for calculating the row and column address in a pixel in the memory from the number of the block containing this pixel and from the address relating to the pixel in the block, which means are constituted by an operator which in the binary word representing the number of the block separates the "e" bits of the least significant weight, where "e" is an integer such that two powers "e" are equal to the number of blocks per memory row, these "e" bits being conveyed to a concatenation element where they are shifted to the left and are concatenated with the bits respresenting the address relating to the pixel in the block, to furnish the address searched in the horizontal direction, i.e. the memory column number, the further bits (having a weight higher than "e") furnishing the component of the address searched in the vertical direction, i.e. the memory row number.

The picture which is processed blockwise is consequently organised in a network of blocks of a regular arrangement (like a checker board). Nevertheless, when a motion compensation method is applied, which is known per se, the decoding of compressed pictures requires access not only to the data of a block exactly corresponding to a block H*V of the network of blocks of a picture, but also to a block which was shifted in the horizontal and/or the vertical direction relative to a block of the network and consequently belonging to four different blocks of the network. To this effect, for the calculation of an address in the memory of the pixels contained in a picture block which has been shifted with respect to a block of the said network, the calculation being effected from the address of this block in the network, denoted the reference block, and of the shift of the block shifted with respect to this reference block, by knowing the number of blocks contained in the horizontal direction in the picture, the arrangement includes one or a plurailty of the following assemblies:

first means for calculating, from the shift of the shifted blocks, how far the block has been shifted in the horizontal and the vertical direction relative to the reference block and for calculating its relative position with respect to the network block containing its starting point, horizontally and vertically, second means for calculating, from the shift of the shifted block, from the address of the reference block, and from the number of the blocks of each picture in the horizontal direction, the number, in the picture, of the block containing the starting point of the shifted block, third means for generating the two components of the address relative to the pixel within the block whose number is supplied by the preceding means, fourth means for shifting to the left the bits of the vertical component of the address with respect to the pixel and to concatenate it with the bits of the horizontal component of this relevant address, in order to furnish a relevant "linear" address in the memory block ("linear address" is to be understood to mean the fact that it is calculated by consecutively numbering all the pixels of a block from the very beginning), fifth means constituting an operator which in the binary word indicating the number of the block separates the least significant "c" bits, where "e" is an integer such that two powers "e" are equal to the number of blocks in each memory row, these "e" bits being conveyed to a concatenation element where they are shifted to the left and are concatenated with the bits supplied by the preceding means to furnish the component of the address searched in the horizontal direction (number of the memory column), the further bits of the said binary word furnishing the component of the address searched in the vertical direction (number of the memory row).

The said first means can advantageously be formed by an operator which separates the m least significant bits in the binary word expressing the value in the horizontal direction of the shift of the block which has been shifted with respect to the reference block, and an operator separating the p least significant bits in the binary word expressing the value of the shift in the vertical direction of the shift of the block which has been shifted with respect to the reference block.

The said second means can advantageously be formed by a first adder which produces the sum of the value of the reference block in the vertical direction and the value of the shift of the block in the vertical direction, a multiplier for multiplying the result produced by this first adder by the value of the number of blocks per picture in the horizontal direction, a second adder which produces the sum of the value of the address of the reference block in the horizontal direction and the value of the shift of the block in the horizontal direction, and a third adder producing the sum of the value supplied by the second adder and the value supplied by the multiplier.

The said third means can advantageously be formed by one or a plurality of the following groups of elements:

a group comprising a multiplexer for supplying a value chosen from either zero or the value of the relative position in the horizontal direction of the block shifted with respect to the block of the network which contains its starting point, and a counter which can be initialized with the value supplied by the multiplexer and which at the rate of a clock supplies the horizontal component of an address relative to the pixel, a group formed in an identical manner and processing the corresponding elements in the vertical direction.

a group comprising an arithmetic unit which supplies the two's complement of the binary word expressing the value of the relative position, in the horizontal direction, of the block which was shifted with respect to the block of the network containing its starting address, a multiplexer for supplying a value chosen from either zero or the said two's complement, and a counter which can be initialized with the value supplied by the multiplexer and, at the rate of a clock, supplies the horizontal component of an address relating to the pixel, a group which is formed in an identical manner and processes the corresponding elements in the vertical direction.

BRIEF DESCRIPTION OF THE DRAWINGS

The following description which is given with reference to the accompanying drawings describing nonlimitative examples, will make it better understood how the invention can be put into effect.

DETAILED DESCRIPTION OF PREFERRED EMBODIMENTS

Figure 1:
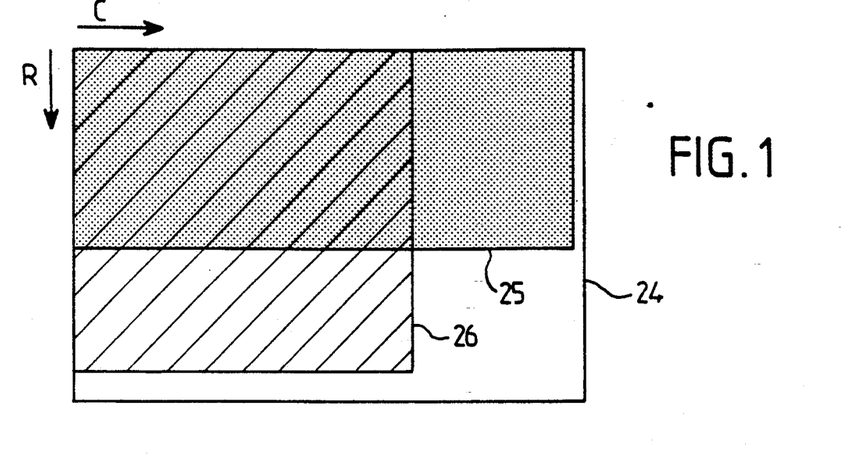
FIG. 1 illustrates a drawback of the method commonly denoted the "bit map" method.

In FIG. 1, the box 24 represents a memory which is organised in rows R and columns C. When a "bit map" organisation is used, the row length of the memory must must be sufficient to contain the width of the picture 25 stored there. But if it is desirable that the picture format can be changed and that, for example, a picture 26 of a smaller width but of a greater height can be utilized, the number of rows of the memory must be sufficient to contain the picture 26. Moreover, since the number of pixels per line or the number of lines per picture is not a multiple or a sub-multiple of the number of columns or the number of rows of the memory sections, the memory is of a slightly greater dimension than that corresponding to the width of the picture 25 because of the height of the picture 26. The memory can contain a picture designated by the box 24 even when it is only to contain a picture 25 or 26. If, for example, the horizontal format and the vertical format are liable to vary in the ratios ½, 1 or 2, it is necessary to have a four times larger memory than that only containing the number of pixels to de displayed.

Figure 2:
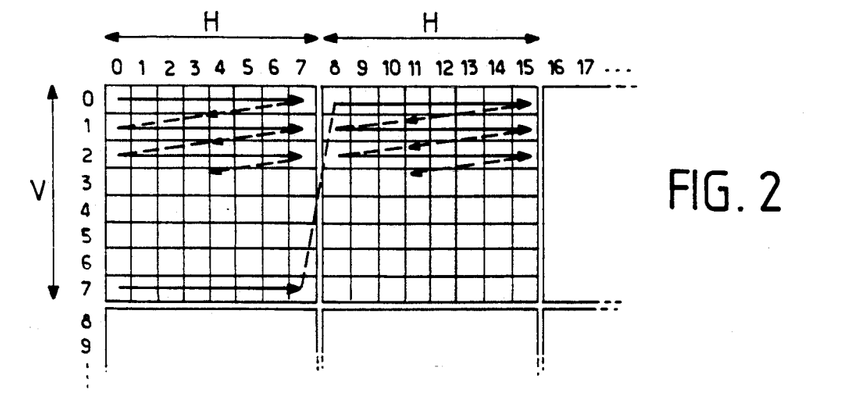
FIG. 2 illustrates the block description mode in a picture.

FIG. 2 illustrates the processing of a picture in blocks, wherein two blocks are shown with their horizontal H and vertical V dimensions which here are both equal to 8. The sequence in which the descriptions of the pixels are processed and arranged in the memory is indicated by arrows. The graduations indicate the coordinates of the pixels in the picture in accordance with x and in accordance with y. The Figure represents the first two blocks above and to the left of a picture and suggests a few other blocks by showing them partly: a picture is thus constituted by a network of regularly distributed blocks as on a checker board.

Figure 3:
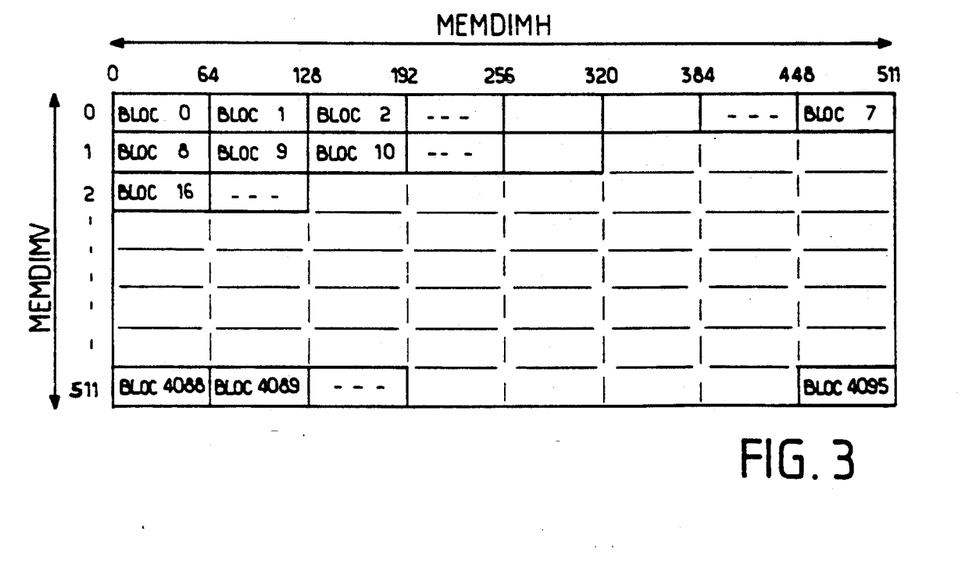
FIG. 3 illustrates the arrangement of the block description in the memory.

A memory of such an organisation that it has a "horizontal" dimension MEMDIMH of 512 columns and a "vertical" dimension MEMDIMV of 512 rows is shown schematically in FIG. 3, in which the positions are indicated in which the descriptions of the blocks are arranged. The notions horizontal and vertical must be understood to be used only for the sake of simplicity and have no connection with the physical arrangement of the memory elements, they actually only refer to two dimensions of a matrix. The blocks denoted BLOC0 and BLOC1, for example, correspond to the respective positions in the memory of the description of the content of the first and the second block above and to the left of a picture, which are shown in FIG. 2.

The layout of FIG. 3 corresponds to the case in which a row of the memory contains an integral number of blocks (8 blocks here: from 0 to 7) and in which the number of memory rows (five hundred and twelve rows in the present case: from 0 to 511) multiplied by the number of blocks per row is equal to the total number (integral) of blocks.

In a non-ideal case, it is sufficient if at a given moment the remaining room in a row of the memory is not sufficient for the complete description of a block, to defer the beginning of the description of this block to the subsequent row. However, for the sake of simplicity of the description, let it be assumed that the horizontal dimension MEMDIMH of the memory is a multiple of H*V, and the integral equal to MEMDIMH/H*V) will be denoted k. This hypothesis is absolutely realistic as in actual practice MEMDIMH, H, V are always powers of two.

To avoid any ambiguity, in the absence of a more precise description, the word "position" will be used when a position in a picture is meant, and the word "address" when a position in a memory is meant.

The picture to be stored has the horizontal and vertical dimensions IMADIMH and IMADIMV, where IMADIMH is a multiple of H and IMADIMV is a multiple of V. Let it be assumed that the memory is sufficiently large to store all the pixels of the picture, that is to say:

*MEMDIMH\*MEMDIMV>IMADIMH\*IMADIMV.*

Let:
  2 powers m be equal to H
  2 powers p be equal to V
  "div" must be understood to be the operator of the integral division
  "mod" must be understood to be the modulo operator.

Since the addressing mode is based on blocks H by V, the number of the block H*V in the image is determined in a first time period from the coordinates of the pixel x, y in the picture. To that end the horizontal and vertical components of the first element of the block H*V in the picture, ADBLOCH and ADBLOCV are calculated:

$$ADBLOCH = x \ div \ H \qquad (1)$$

$$ADBLOCV = y \ div \ V \qquad (2)$$

The number of the block in the picture NUMBLOC is derived therefrom, calculated in continuous sequence starting from the first block above and to the left (FIG. 3):

$$NUMBLOC = (IMADIMH \text{ div } H) * ADBLOCV + ADBLOCH \quad (3)$$

From the coordinates of each pixel, the associate addresses ADRELH, ADRELV of the pixel within a block are determined:

$$ADRELH = x \text{ mod } H \quad (4)$$

$$ADRELV = y \text{ mod } V \quad (5)$$

$$ADREL = ADRELV + H + ADRELH \quad (6)$$

The calculation of an address of a block of the picture, BLOCH and BLOCV in addressing operation in accordance with the invention is effected on the basis of its block number, NUMBLOC:

$$BLOCH = (NUMBLOC \text{ mod } k) * (H*V) \quad (7)$$

$$BLOCV = (NUMBLOC \text{ div } k) \quad (8)$$

One has all the elements available to calculate the address ADRX of the memory row and the address ADRY of the memory column, for a pixel of a picture:

$$ADRX = BLOCH + ADREL \quad (9)$$

$$ADRY = BLOCV \quad (10)$$

The mode of realizing the calculation of ADRX and ADRY from the previously developed calculations, by separating the coordinates x, y of the pixel in the picture, will now be described with reference to FIG. 4.

Let:
2 power a be equal to IMADIMH
2 power b be equal to IMADIMV
2 power alpha be equal to MEMDIMH
2 power beta be equal to MEMDIMV
2 power e be equal to k
with the condition that it is possible to store the picture:

$$alpha + beta > a + b$$

For the example shown, blocks of 8 by 8 pixels have been chosen but the method can also be used for other values of H and V.

The values chosen for H,V and k are integral powers of 2. In this case the operators div and mod can be realised in a simple manner: it is sufficient to split a bit field into two bit fields denoted MSB and LSB, which supply the values resulting from the operations div and mod, respectively, (the point of separation of the bits depend on the value of the divider H, V or k). This dichotomy is realized by the modules denoted "OP" in FIG. 4 (and in the FIGS. 9 and 13). The module "CONC" creates a bit field from the concatenation of two bit fields MSB and LSB. The other modules: "+" (adder) and "*" (multiplier) are known to a person skilled in the art.

Unless stated to the contrary, the operator modules OP effect an integral division by 8, that is to say that the separation is effected between the third and the fourth bit.

From the coordinates x and y of the pixel to be processed, conveyed to the connection 13 and 14 provided with a wires and b wires, respectively, the respective modules OP 11 and 12 supply the values ADBLOCH, ADRELH, ADBLOCV, ADRELV, in accordance with the formulae (1) (2) (4) (5) indicated in the foregoing, via the connections provided with a-m wires, m wires, b-p wired and p wires, respectively.

From the values ADRELV and ADRELH, the module CONC 23 shifts the bits of ADRELV through m positions which corresponds to a multiplication by H, and concatenates them with the bits of ADRELH to realize the formula (6) stated in the foregoing, and thus supplies ADREL via a connection provided with p+m wires.

From the values IMADIMH and IMADIMV via the connections 15 and 1 provided with a and b wires, respectively, the module OP 18, which uses V as the divisor, supplies via a connection provided with b-p wires a value NBLOCV which represents the number of vertical blocks in the picture, and the module OP 17, which uses H as its divider, supplies via a connection provided with a-m wires the value NBLOCH which is equal to IMADIMH div H of formula (3), i.e. the number of horizontal blocks in the picture. To realize the formula (3), this value is multiplied by ADBLOCV in the multiplier 19 and the result of the multiplication is added to the term ADBLOCH by an adder 20 which thus supplies NUMBLOC.

The value NUMBLOC is taken up by a module 21 whose divisor is k, and which consequently supplies BLOCV=ADRY in accordance with the formulae (8) and (10), and NUMBLOC mod k (thus a: 2e=k, since the module OP separates the least significant bits "e"). In the module CONC 22, the bits of said last value are shifted through m+p positions, which corresponds to a multiplication by H*V to obtain the formula (7), and a concatenation with ADREL, which realizes the formula (9) and supplies ADRX.

The general designation "description of a pixel" may relate to the luminance as well as to the chrominance.

The diagram described in the foregoing illustrates the step which enables the material processing of formulae. When the display circuits of the system (which are not part of the invention) generate the coordinates x, y of the pixel to be displayed in the picture, the above-described addressing device calculates the addresses ADRX and ADRY of the pixel in the memory and can consequently be used to display the picture.

When a motion compensation method is used, in which decoding of the compressed pictures requires access to a block which is shifted in the horizontal and-/or vertical direction relative to a network (i.e. relative to a block of the network) and consequently can belong to a maximum of four different blocks of this network, an other means is used, which will be described hereinafter with reference to FIGS. 7 to 12. This relates, for example, to the block E of FIG. 5, whose pixels belong to four blocks A, B, C, D. In addition, the display device must be able to access an assembly of pixels forming a line (or a section of a line) of a picture.

Before the actual display, the decoding device must read the pixels of the picture in the form of "luminance+colour differences" (Y, U, V) to generate the pixels which are defined by their three basic colours (R, G, B). On the other hand, to save place, only a portion of the video line is intermediately stored within the decoding device. The device for blockwise addressing renders it possible to dispose in one and the same row of the memory of MEMDIMH/V pixels, belonging to the same video line and consequently accessible in the same burst. If a memory having a dimension equal to MEMDIMH/V is used, optimum communication performances between the storage memory and the decoding device are obtained.

An operation consisting of the following sequence is denoted "burst-like access":

conveying a "row address" and the corresponding signal "RAS" (row address selection) to the memory, conveying a "column" address and the corresponding signal "CAS" (column address selection) to the memory, conveying to the memory a sequence of "column" addresses for all the pixels one wants to access and which are situated in the same row.

In a "bit map" addressing device, access to a block H*V is effected by V burstlike accesses of H pixels. In an arrangement in which the pictures are addressed blockwise, access to a block having a dimension H*V is effected in one signal burst access of H*V pixels when the block one wants to access is located exactly on the block boundary and in four burst accesses at a maximum when the block covers several blocks.

Figure 5:
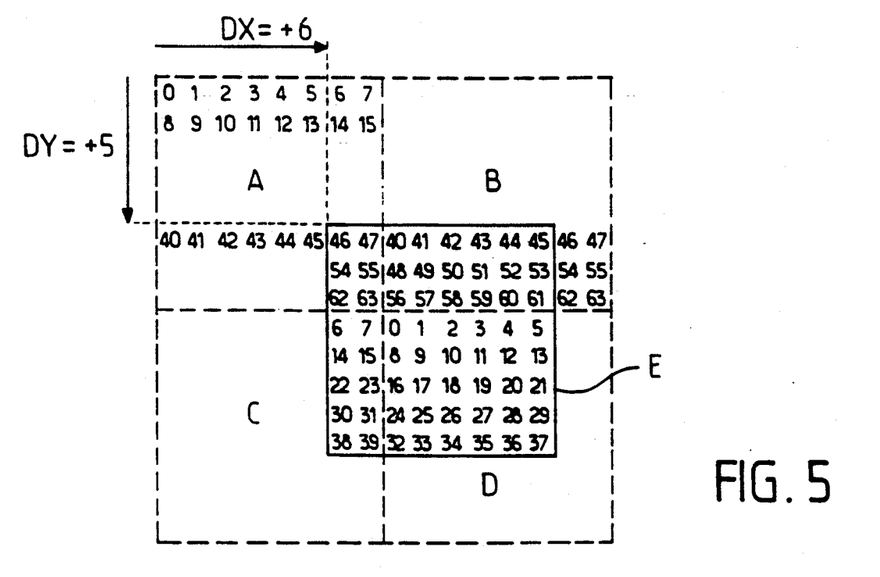
FIG. 5 illustrate the position in a picture of a motion-compensated block.

For example, to access the block E of FIG. 5, which shows the physical arrangement of the block in a picture, the starting address of the block A is taken to which there are successively added the relative addresses in this block A: 4, 47, 54, 55, 2, 3, thereafter the starting address of block B is taken with successively the relative addresses in the block B: 40 to 45, 48 to 53, 5 to 1, and so forth for blocks C and D.

Figure 6:
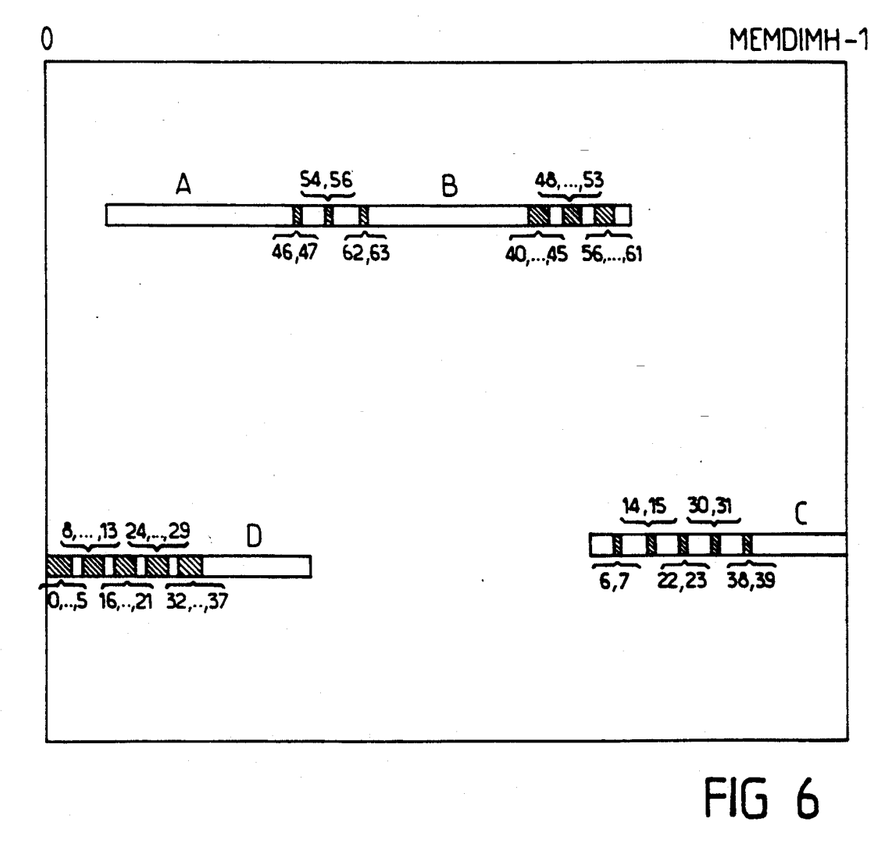
FIG. 6 illustrates the positions occupied in the memory by the block E of FIG. 5.
Figure 7:
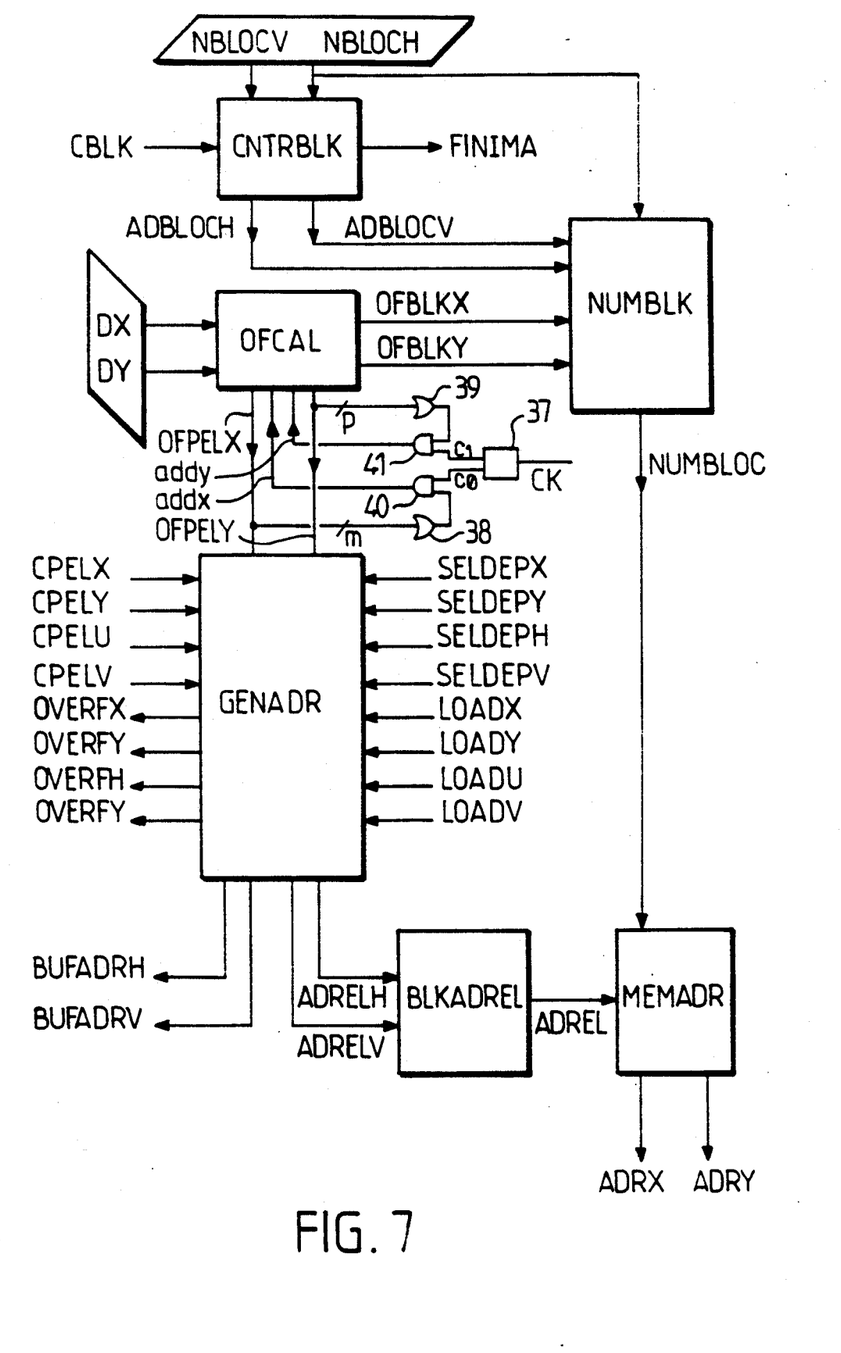
FIG. 7 illustrates an arrangement for calculating in the memory the addresses of the pixels of a motion-compensated block.

FIG. 6 shows the same sequence, but this time considered from the memory positions: the blocks A, B, C, D are found there and the relative positions of the pixels in each block, mentioned in the preceding paragraph.

If blocks are processed whose dimension V is definitely greater than 4, the addressing device in accordance with the invention renders it possible to access a motion-compensated block of size H*V in a faster manner than for a "bit map" addressing, and to access a block which accurately corresponds to a memory block, the access is faster, irrespective of the values of H and V.

The arrangements described hereinafter correspond to putting the addressing method which is linked with the specific addressing of the memory into operation. This specific address (per row, per block, ...) renders the use of special devices, adapted to the address calculation to be realised necessary.

For the processing of motion-compensated blocks, an addressing device is used which is intended to generate the addresses of the pixels associated with a block whose starting address is equal to the address of a memory block which is shifted horizontally by DX and vertically by DY, such as the block shown in FIG. 5 where E is the block which is motion-compensated with respect to the block A with DX=+6 and DY=+5. This device is described with reference to FIG. 7. At its input it receives NBLOCH and NBLOCV, i.e. the numbers of blocks H*V in the vertical and the horizontal direction calculated by the modules 17 and 18 of the circuit of FIG. 4, and also the horizontal and vertical displacements or shifts DX and DY of the motion-compensated block. It generates the addresses of the row ADRX and of the column ADRY of the stored pixel as well as the addresses of the row BUFADRH and of the column BUFADV of the same pixel in a buffer memory intended to receive the motion-compensated block.

Figure 8:
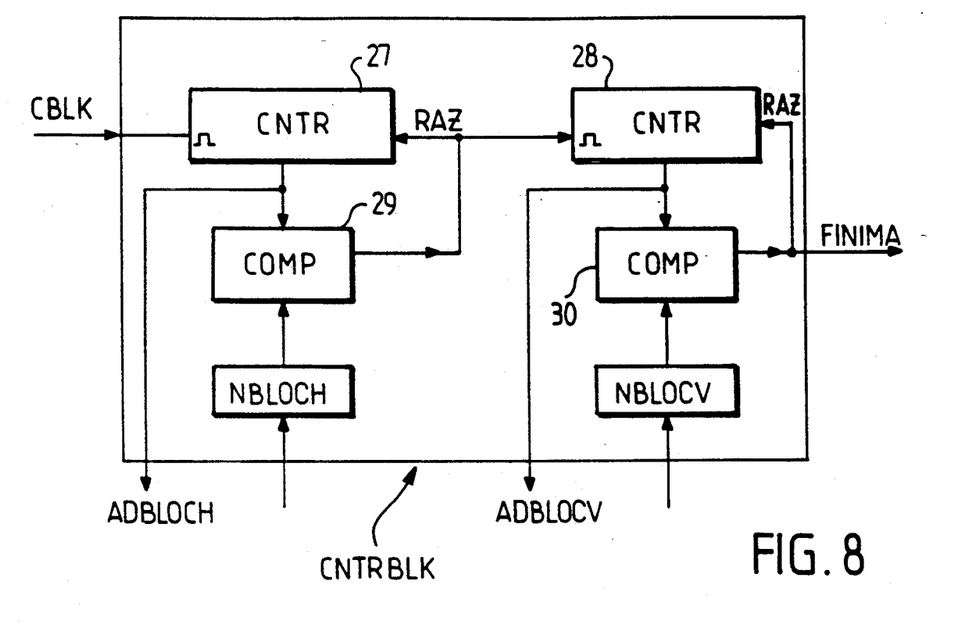
FIGS. 8 to 11 illustrate in greater detail different modules of FIG. 7.

On receipt of a block synchronizing signal CBLK, the device CNTRBLK which is shown in greater detail in FIG. 8 counts in the counters CNTR 27 and 28 the number of the current block. This number is compared in the horizontal and vertical directions, in comparators 29 and 30, respectively, to the values NBLOCH and NBLOCV. The comparator 29 resets the counter 27 to zero at each end of a line of the picture and simultaneously increments the counter 28 by one unit. The comparator 30 produces a signal FINIMA which indicates that the last block of the picture has been processed. The device CNTRBLK generates the starting address of the current block ADBLOCH, ADBLOCV, as did also the device of FIG. 4, but here from the block synchronizing signals, and not from a pixel address x,y.

Figure 9:
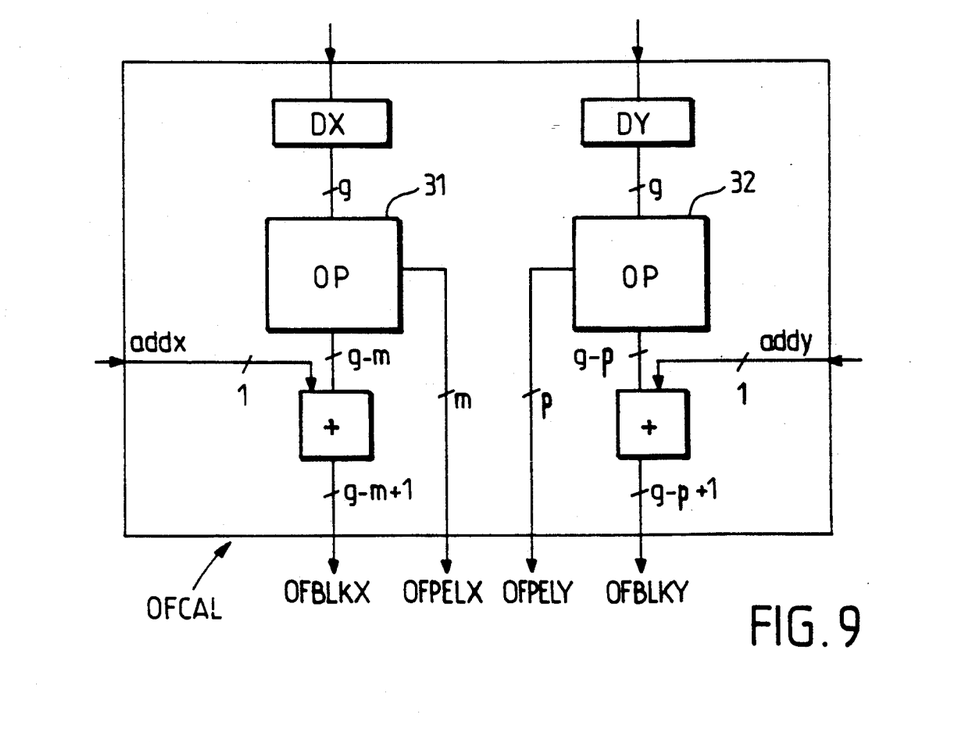

The device OFCAL which has for its task to calculate the shift or "offset" of the block OFBLKX, OFBLKY and the shift or "offset" of the pixel OFPELX, OFPELY to be added to block and pixel addresses of the current block because of the motion compensation, is shown in FIG. 9. It is constituted by a block OP 31 separating the m least significant bits of the binary word expressing the value in the horizontal direction DX of the shift of the block shifted with respect to the reference block, and a block OP 32 separating the p least significant bits of the binary word expressing the value DY in the vertical direction of the shift of the block shifted with respect to the reference block. The least significant bits supply the values OFPELX and OFPELY. It should be noted that the shift DX and DY are supplied by a motion detecting device which is independent of the present device (and is not part of the present invention), and that the shifts it produces may exceed eight pixels, so that the shifted block can have its starting point outside the reference block (put differently, "g−m" does not equal zero).

For the recovery of the block E (FIG. 5), it is necessary to access the pixels located in the blocks A, B, C and D. To that end, two bits, denoted addx and addy serve to designate which one of the four squares A, B, C, D is acted upon. These bits addx and addy are determined from the shift values OFPELX and OFPELY, and from a synchronizing signal CK which indicates the block change during the path from A to B and then from C to D. A very simple circuit used for this purpose (FIG. 7) is constituted by a counter 37 which counts the signals CK. This counter counts from zero to three and then down again to zero. Consequently, the counting figure emerges on two bits. At the output of the counter 37, the least significant bit relates to addx and the most signficant bit relates to addy. Thus, during accessing of the block A, addx and addy have zero values; during accessing of the block B addx has a value 1 and addy has the value zero; during accessing of the block C, addx has the value zero and addy has a value 1; finally, during accessing of the blcok D, addx and addy have a value 1. To take account of the case in which (in one direction or the other), the shift will be accurately equal to an integral number of blocks, the bits of one of the binary words OFPELX or OFPELY then all being equal to zero, these values OFPELX and OFPELY are conveyed in parallell to the inputs (there are as many inputs as there are bits in each word) of respective OR-gates 38 and 39, whose output signals are conveyed to a control input of respective AND-gates 40, 41, and the bits addx and addy must pass through the gate 40 or the gate 41, respectively, to be validated.

Finally, the bits addx and addy are added by the modules "x" (FIG. 9) to the output values (highest order bits) of the modules 31 and 32, respectively, to supply OFBLKX and OFBLKY.

Figure 10:
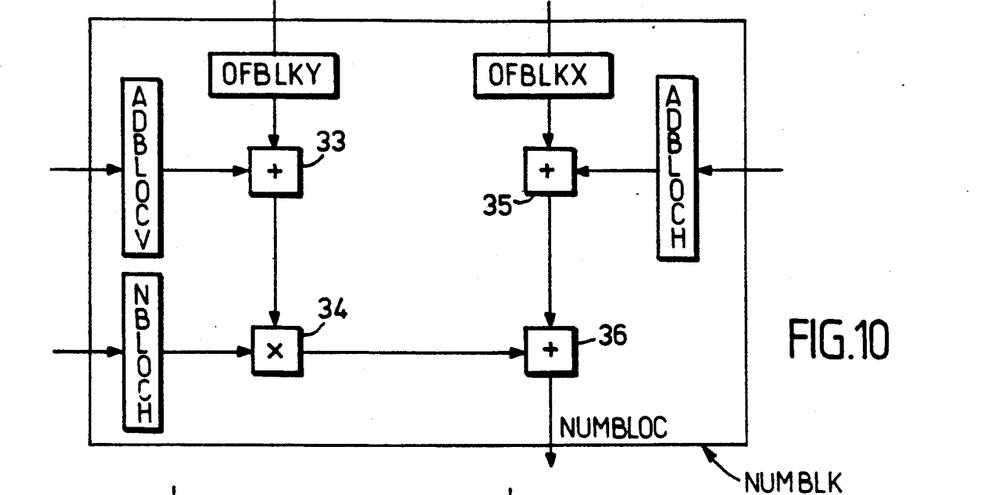

The device NUMBLK which is shown in greater detail in FIG. 10, is formed by a first adder 33 which takes the sum of the value of the address of the reference block in the vertical direction (ADBLOCV) and the value of the shift of the blcok shifted in the vertical direction (OFBLKY), a multiplier 34 for multiplying the result produced by the first adder by the value of the number of blocks of each picture in the horizontal direction (HBLOCH), a second adder 35 taking the sum of the value of the address of the reference block in the horizontal direction (ADBLOCH) and the shift value of the block shifted in the horizontal direction (OFPELX), and a third adder 36 taking the sum of the value supplied by the second adder and the value produced by the multiplier.

Figure 11:
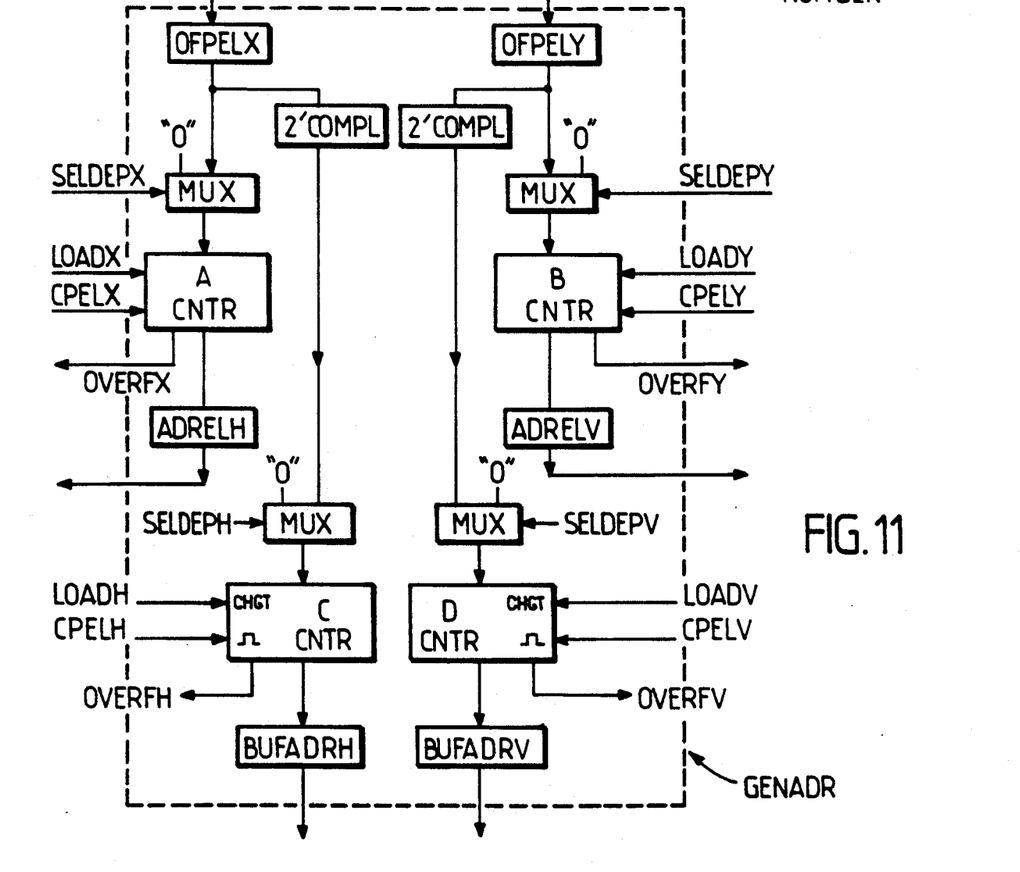

The device GENADR, which is shown in greater detail in FIG. 11, has for its function to generate the relative address of the pixels, within the motion-compensated block. Reference can also be had to the FIGS. 5 and 6 which illustrate an example which can be used to explain the sequence of addresses to be generated by the device GENADR for each memory block to which the shifted picture block belongs. A control device, not shown and which is not part of the invention and can be easily conceived by a person skilled in the art, has for its function to generate the control signals for the operative section: the signals CPELX, CPELY, CPELH, CPELV are clock signals for incrementing the respective counters A,B,C,D, the signals LOADX, LOADY, LOADH, LOADV are signals for loading an initial value in the respective counters A, B, C, D, and the signals SELDEPX, SELDEPY, SELDEPH, SELDEPV are information signals for controlling the choice of the variable transmitted by multipliers MUX, which variable is either zero or OFPELX, OFPELY, respectively, the two's complement of OFPELX, the two's complement of OFPELY.

One first of all wants to access the pixels 46, 47, 54, 55, 62, 63 which are all located in the same row of the memory in block A. To that end the counter A CNTR is loaded with the value OFPELY by acting on the signals SELDEPX and LOADX, similarly by acting on the signals SEPDEPY and LOADY, the counter B CNTR is loaded with the value OFPELY. In the same manner as for the signals SELDEPH, SELDEPV, LOADH and LOADV, the counters C CNTR and D CNTR are loaded with zero indicated by "0" in the Figure. At each new pixel accessed in the memory, the counter A CNTR and C CNTR are incremented. When the counting value of the counter A CNTR reaches H, OVERFX is set to 1 which results in the counters B CNTR and D CNTR being incremented, and the counter A CNTR to be loaded with OFPELX and the counter C CNTR with zero and one starts to increment A CNTR and C CNTR again, which cycle continuous until the count in B CNTR reaches V which sets OVERFY to 1. At that instant all the pixels one wants to access in the block A have been obtained and arranged in a temporary buffer store at addresses supplied by the counter C CNTR and D CNTR.

Then one proceeds to addressing of the pixels of the block B. To that end, the counter A CNTR is first loaded with zero by acting on the control wires SELDEPX and LOADX, the counter B CNTR and D CNTR are loaded in the same manner as for the access of the block A, the counter C CNTR is loaded with the two's complement of OFPELX by acting on the control wires SELDEPH and LOADH, and an iterative procedure similar to the procedure described for accessing the block A takes place until the counting value of the counter B CNTR is higher than or equal to V. Thereafter, the pixels of the block C are accessed by charging the counter C CNTR and B CNTR with zero, the counter A CNTR with OFPELY and the counter D CNTR with the two's complement of OFPELY and an iterative procedure occurs again, until the counting value of the counter D CNTR will this time be higher than or equal to V.

Finally, the pixels of the block D are accessed by charging the counter A CNTR and B CNTR with zero, the counter A CNTR and C CNTR with the two's complement of OFPELX and OFPELY, respectively, by always acting on the same control wires and an iterative procedure occurs again, until the counting value of the counter D CNTR is higher than or equal to V, which terminates the access to the relevant pixel block.

The counters C and D operate in the same way, and it is not necessary to describe their mode of operation specifically: it is sufficient to replace the signals denoted X or Y in the foregoing by the same signals denoted H or V, and to note that the initial values to be loaded in the counters are the two's complements, generated by the modules bearing the reference 2/COMPL, of the values OFPELX and OFPELY. These counters supply the values BUFADRH and BUFADRV which are the addresses relating to the pixel within the shifted block, and renders it possible to address a buffer memory used for the processing of a block.

Figure 12:
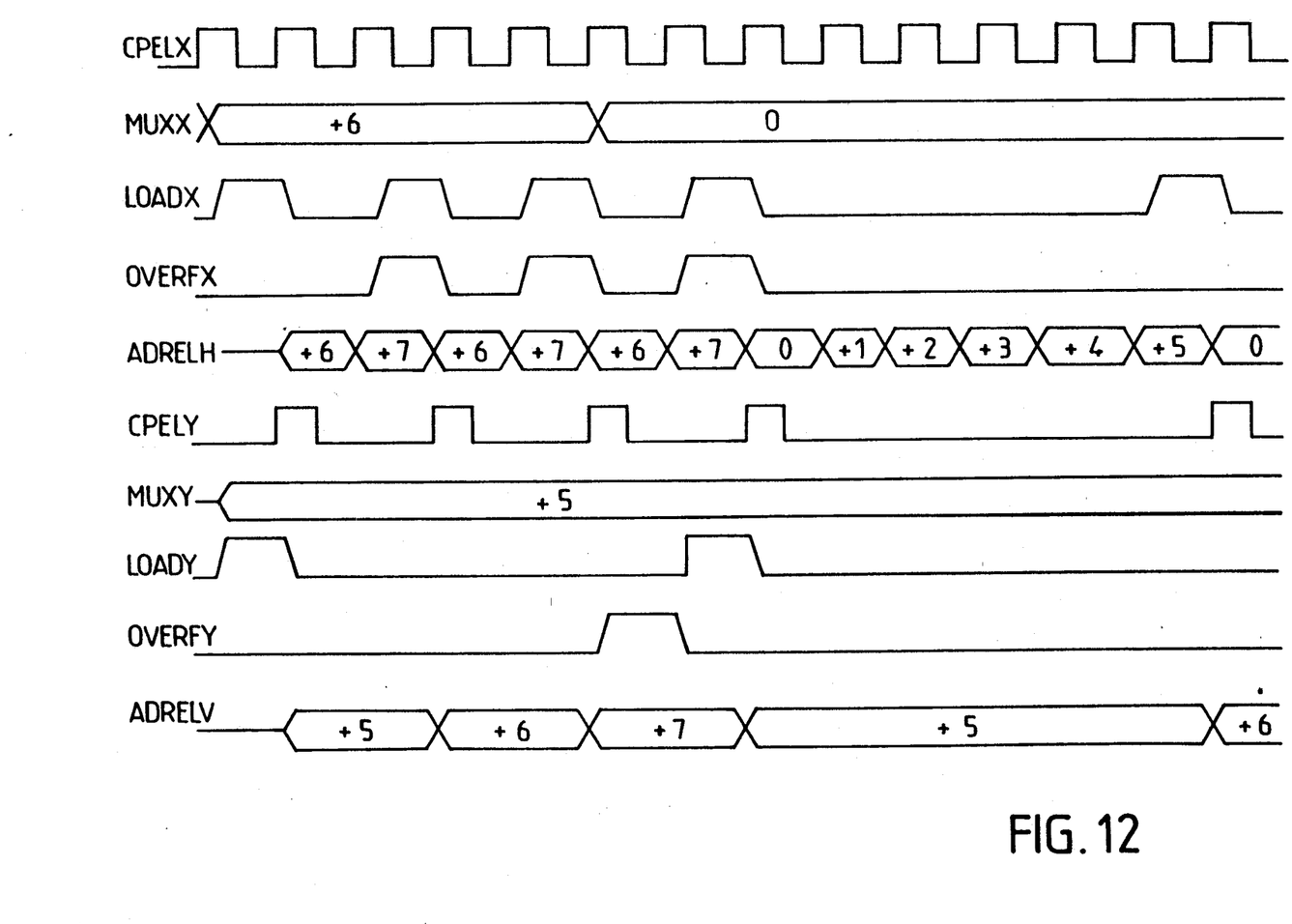
FIG. 12 is a time diagram for the operations effected by the device GENADR of FIGS. 7 and 8.

The mode of operation of the device GENADR is illustrated by FIG. 12 where the control signals relating to the device GENADR and corresponding to the example shown in FIGS. 5 and 6 are shown. The signal CPELX is the clock signal a period of which corresponds to the processing time of a pixel; the line MUXX indicates the action of the multiplexer: its output is set at OFPELX (= +6) during the six periods corresponding to the six pixels 46, 47, 54, 55, 62, 63 of the block A, thereafter it is set to zero for the other blocks B and D and to the position OFPELX for the block C; the signal LOADX controls loading of the counter A CNTR with the product of the multiplexer, before the pixel 46 of the block A, before the pixel of block A, before the pixel 62 of block A, before the pixel 40 of the block B, etc; the signal AVERFX is triggered when the counting value of the counter A CNTR has reached eight (=H), i.e. after two time periods since it is initialised at six: finally the line ADRELH indicates the result, namely the address relating to the pixel in its reference block, for the pixels 46, 47, 54, 55, 62, 63 of block A, thereafter the pixels 40 to 46, 48 of block B . . . The subsequent lines which relate to the relative address in the vertical direction can be explained in the same way with the exception that the clock CPELY is triggered in correspondence with the signal LOADX. When, for example, one proceeds, in block B, from the pixel 45 to the pixel 48, the value "48" must be loaded into A CNTR and at the same time B CNTR must be incremented.

Figure 4:
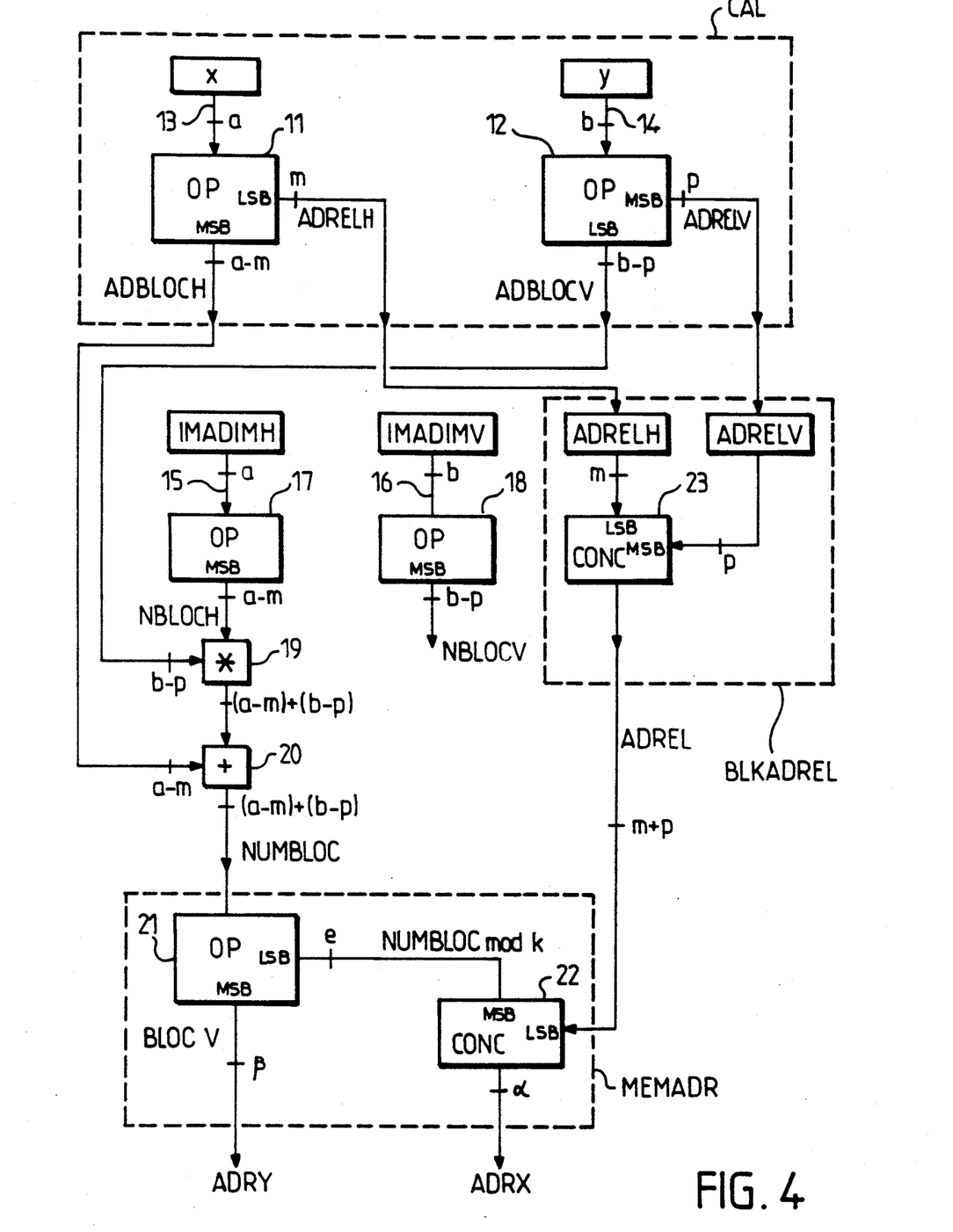
FIG. 4 is a circuit diagram of the arrangement for calculating the addresses.

The device BLKADREL which forms the address relating to the pixel on the basis of its horizontal and vertical coordinates in the block, and the device MEMADR which has for its function to form the address of each pixel on the basis of the block number and the relative address of the pixel in the block, are the same as those indicated in FIG. 4 having the same references.

Figure 13:
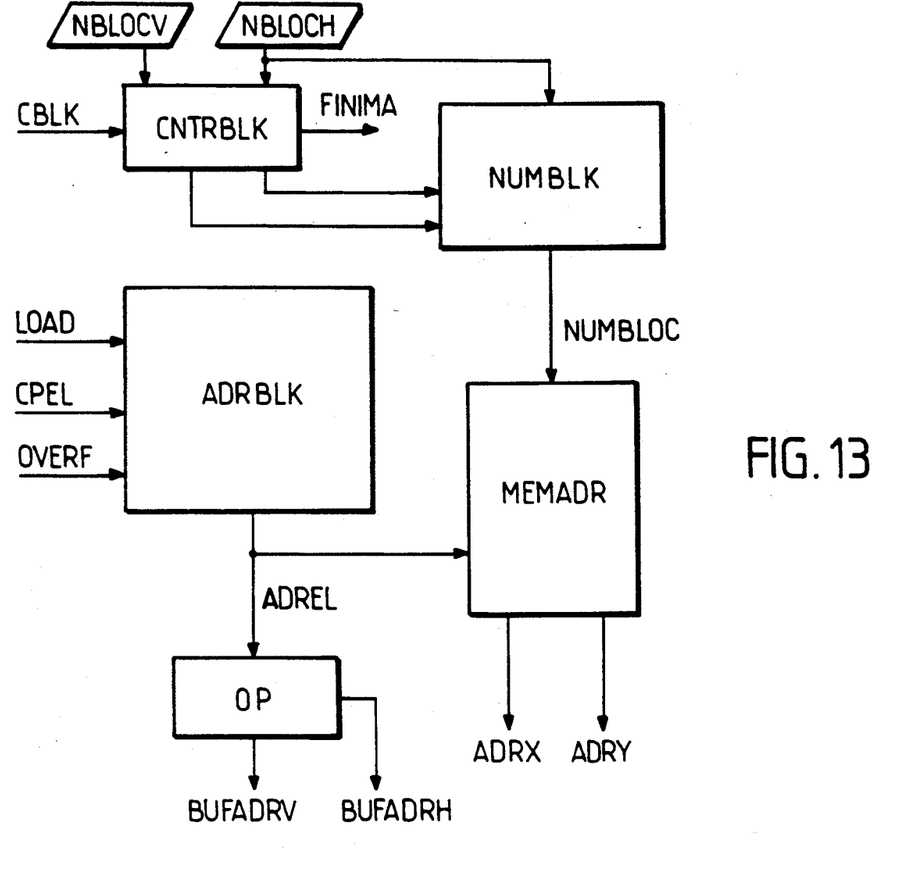
FIGS. 13 and 14 illustrate a simplified embodiment of the device of FIG. 7 for the case of a non-motion compensated block.
Figure 14:
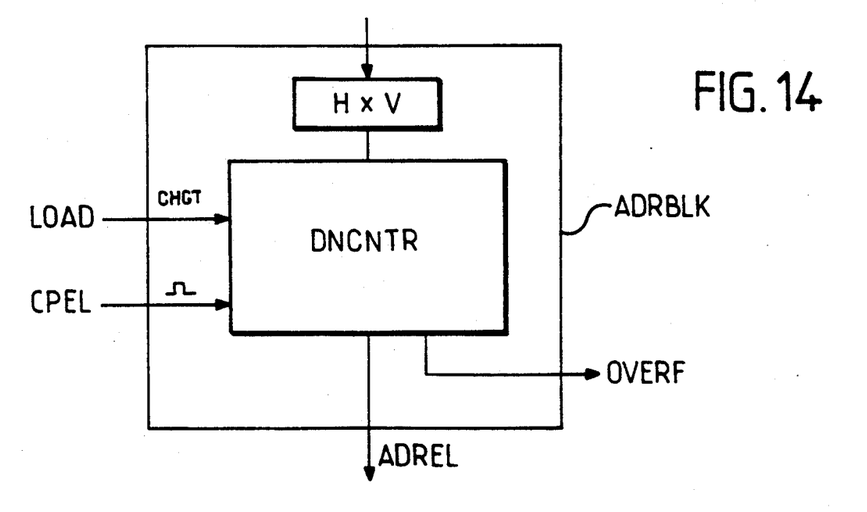

When there is zero shift, the device described in the foregoing can be significantly simplified as the addresses of the pixels which are always located inside the same memory block are generated. Then the addressing device shown in FIG. 13 is used which is of a similar structure as the device described above for the calculation of addresses of a motion-compensated block. The modules CNTRBLK, NUMBLK, MEMADR, OP are identical to the modules which have already been described and have the same references. The module ADRBLK is shown in greater detail in FIG. 14. It is constituted by a down-counter which counts down in response to a clock signal CPEL and is initialised by the value H*V under the action of a control signal LOAD. The counting value it supplies is ADREL and it indicates that it has arrived at its maximum counting capacity by supplying a signal OVERF.

We claim:

1. A method for processing a picture comprising lines of pixels for storage in a memory having burst-type access and addressed by a row address and a column address, each pixel having a pixel value, the method comprising the steps of:
   a) separating said picture into a plurality of rectangular blocks of pixels, each block comprising a plurality of pixels arranged along parallel lines and having a respective position within the respective block defined by a respective horizontal position and a respective vertical position;
   b) determining a block description for each block of pixels, by determining, in a given sequence, the respective pixel values of each consecutive pixel disposed along each respective parallel line of each respective block;
   c) consecutively storing said block descriptions in said memory, placing for each consecutive block description, the respective pixel values determined in step b) in respective memory locations addressed in accordance in said given sequence.

2. The method as claimed in claim 1, wherein the memory locations are addressed by providing a row, column address for each memory location by assigning for each consecutive row O to m, column address O to n, where m and n are integers.

3. The method as claimed in claim 1, wherein the number of horizontal positions and the number of vertical positions, of each block, are each an integral power of two, and wherein a memory address for a first block description containing a given pixel value of a given pixel is calculated by the additional step of:

dividing the respective horizontal and vertical positions of the given pixel in the picture, by the maximum number of horizontal and vertical positions in said picture respectively.

4. An apparatus for processing a picture comprising lines of pixels for storage in a memory having burst-type access and addressed by a row address and a column address, each pixel having a pixel value, the method comprising the steps of:
   a) means for separating said picture into a plurality of rectangular blocks of pixels, each block comprising a plurality of pixels arranged along parallel lines and having a respective position within the respective block defined by a respective horizontal position and a respective vertical position;
   b) means for determining a block description for each block of pixels, by determining, in a given sequence, the respective pixel values of each consecutive pixel disposed along each respective parallel line of each respective block;
   c) means for consecutively storing said block descriptions in said memory, placing for each consecutive block description, the respective pixel values provided by said determining means in respective memory locations addressed in accordance in said given sequence.

5. The apparatus claimed in claim 4 wherein said stored block descriptions each have respective block numbers reflecting their respective consecutive location in said memory, the apparatus further comprising:
   means for calculating the block number of a first block description from the respective horizontal and vertical positions in said picture of a given pixel of said block.

6. The apparatus of claim 4 wherein said storing means comprises:
   means for calculating the address of a memory location of a first pixel value of a first block, from the respective horizontal and vertical positions in said picture of the corresponding pixel in said picture having said given pixel value.

7. The apparatus of claim 6 wherein said horizontal and vertical positions are digital words each having a respective most significant bit, wherein a line of said picture has N blocks, where N is an integer, and wherein said calculating means comprises:
   a) means for extracting from said horizontal and vertical positions respectively most significant bits h and p;
   b) means for multiplying N and p to obtain a product; and
   c) means for adding the product to h.

* * * * *